United States Patent
Krauss

(10) Patent No.: US 9,372,894 B2
(45) Date of Patent: *Jun. 21, 2016

(54) SCORING RELATIONSHIPS BETWEEN ENTITIES BASED ON PROXIMITY IN SPACE AND TIME

(71) Applicant: International Business Machines Corporation, Armonk, NY (US)

(72) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 228 days.

This patent is subject to a terminal disclaimer.

(21) Appl. No.: 13/968,215

(22) Filed: Aug. 15, 2013

(65) Prior Publication Data

US 2015/0052151 A1    Feb. 19, 2015

(51) Int. Cl.
*G06F 17/30* (2006.01)

(52) U.S. Cl.
CPC ...... *G06F 17/3053* (2013.01); *G06F 17/30595* (2013.01)

(58) Field of Classification Search
CPC .......... G06F 17/3053; G06F 17/30595; G06F 17/3087; G06F 17/30539; G06F 17/30604; G06F 17/30702
USPC ................................................. 707/743, 749
See application file for complete search history.

(56) References Cited

U.S. PATENT DOCUMENTS

| | | | |
|---|---|---|---|
| 7,917,458 B2 | 3/2011 | Dalton | |
| 8,326,866 B1 | 12/2012 | Upstill et al. | |
| 8,346,020 B2 * | 1/2013 | Guntur | G06F 17/50 345/420 |
| 2009/0099862 A1 * | 4/2009 | Fireman et al. | 705/2 |
| 2009/0319560 A1 | 12/2009 | Cheng et al. | |
| 2010/0161566 A1 * | 6/2010 | Adair et al. | 707/690 |
| 2010/0214417 A1 | 8/2010 | Gennari et al. | |
| 2011/0246494 A1 | 10/2011 | Adair et al. | |
| 2012/0226889 A1 | 9/2012 | Merriman et al. | |
| 2012/0314771 A1 * | 12/2012 | Lim et al. | 375/240.16 |
| 2013/0006976 A1 | 1/2013 | Megler et al. | |
| 2014/0258275 A1 * | 9/2014 | Paritosh | 707/723 |
| 2014/0280318 A1 * | 9/2014 | Simms et al. | 707/769 |

OTHER PUBLICATIONS

"Geohash", From Wikipedia, the free encyclopedia. <http://en.wikipedia.org/wiki/Geohash>; Downloaded May 2, 2013. pp. 1-6.

(Continued)

*Primary Examiner* — Usmaan Saeed
*Assistant Examiner* — Fariborz Khoshnoodi
(74) *Attorney, Agent, or Firm* — Mollborn Patents, Inc.; Fredrik Mollborn

(57) ABSTRACT

Methods and apparatus, including computer program products, implementing and using techniques for determining a relationship score between a first entity and a second entity. A first computer-readable representation of a first spatial region containing the first entity is generated. A second computer-readable representation of a second spatial region containing the second entity is generated. The first computer-readable representation and the second computer-readable representation are compared at decreasing resolutions until a matching condition is reached. A relationship score is assigned to one or more of the first entity and the second entity based on the resolution at which the matching condition is reached.

7 Claims, 4 Drawing Sheets

(56) References Cited

OTHER PUBLICATIONS

Balkić, Zoran, et al., "GeoHash and UUID Identifier for Multi-Agent Systems," Agent and Multi-Agent Systems, Technologies and Applications, pp. 290-298, Springer Berlin Heidelberg, 2012.

Budak Arpinar, I., et al., "Geospatial Ontology Development and Semantic Analytics," Transactions in GIS 10, No. 4, 2006, pp. 551-575.

Malensek, Matthew, et al., "Exploiting Geospatial and Chronological Characteristics in Data Streams to Enable Efficient Storage and Retrievals," Future Generation Computer Systems, Jul. 27, 2012, 31 pages.

Malensek, Matthew, et al., "Expressive Query Support for Multidimensional Data in Distributed Hash Tables," Proceedings of the 2012 IEEE/ACM Fifth International Conference on Utility and Cloud Computing, pp. 31-38, IEEE Computer Society, 2012.

Malensek, Matthew, et al., "Galileo: A Framework for Distributed Storage of High-Throughput Data Streams," 2011 Fourth IEEE International Conference on Utility and Cloud Computing (UCC), pp. 17-24, IEEE, 2011.

USPTO non-final office action. U.S. Appl. No. 14/307,341. Notification date: Jun. 10, 2015.

USPTO office action. U.S. Appl. No. 14/308,093. Notification date: Mar. 9, 2016.

USPTO final office action. U.S. Appl. No. 14/307,341. Notification date: Dec. 17, 2015.

USPTO office action. U.S. Appl. No. 14/080,229. Notification date: Mar. 1, 2016.

\* cited by examiner

SCORING RELATIONSHIPS BETWEEN ENTITIES BASED ON PROXIMITY IN SPACE AND TIME

BACKGROUND

The present invention relates to data analysis, and more specifically, to entity analytics. Entity analytics products perform entity analytics by associating entities (such as ships) with their features (such as loads) and feature elements (such as items and tonnages).

Entity analytics products further allow entities to be associated with space and time data. Some entity analytics products use an entity feature known as a SpaceTimeBox (STB) that reflects a spatial region and a time interval. The STB functionality provides spatial reasoning capabilities for advanced entity resolution, relationship awareness, and insight/relevance detection.

Motion processing can rely on quantization of space and time. Some entity analytics products use STBs for space and time quantization. The motion of entities with respect to STBs can be used to detect specific entity behavior, in real time, which can be published to downstream analytic applications.

The entity analytics product determines a relationship between two entities to exist when the two entities have sufficiently matching feature sets. To resolve multiple entities to be one and the same entity, or to recognize a relationship between entities, the entity analytics product compares the entities' features and returns scores, based on algorithms specific to the types of features being compared. To achieve high throughput, the entity analytics product relies on exact-match comparison in most cases.

SUMMARY

According to one embodiment of the present invention, methods and apparatus, including computer program products, are provided implementing and using techniques for determining a relationship score between a first entity and a second entity. A first computer-readable representation of a first spatial region containing the first entity is generated. A second computer-readable representation of a second spatial region containing the second entity is generated. The first computer-readable representation and the second computer-readable representation are compared at decreasing resolutions until a matching condition is reached. A relationship score is assigned to one or more of the first entity and the second entity based on the resolution at which the matching condition is reached.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

Figure 1:
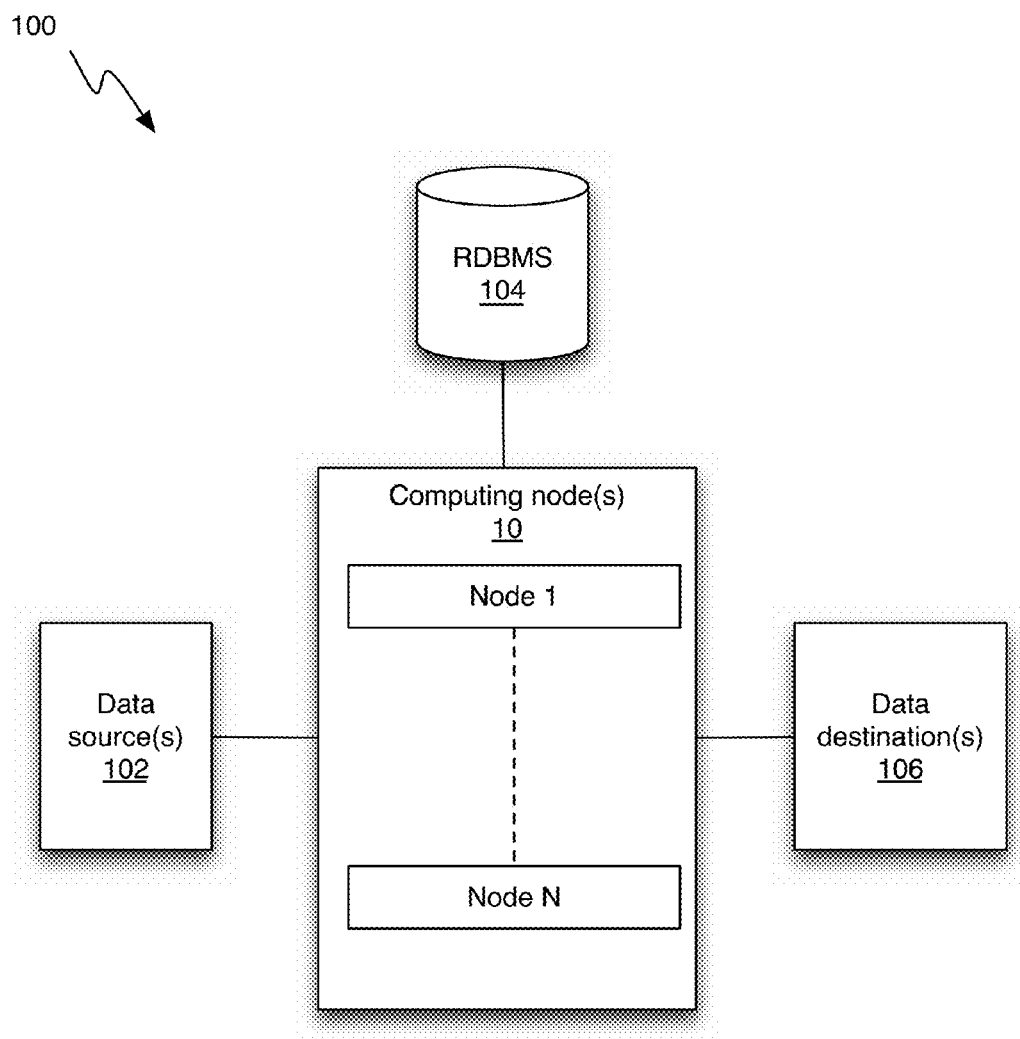
FIG. 1 shows a schematic of an example of an entity analytics system used for entity relationship scoring, in accordance with one embodiment.

As was described above, an algorithm for scoring relationships based on two entities' proximity can benefit from the performance advantages of exact match comparisons. However, because spatial proximity may often be better considered based on distance ranges than on exact matches, it is advantageous to also have techniques for proximity evaluation at a range of spatial densities. Such techniques are described herein.

An STB includes text string or bit vector values that represent a spatial region and a time interval. The text string representing a spatial region can be a geohash string. A geohash string is a series of letters corresponding to a trapezoidal geospatial region. The more letters in the string, the more fine-grained the region is. The geospatial proximity of two events can often be determined by the number of matching letters, from left to right, in their corresponding geohash strings. However, this is not always the case.

The STB feature specifically allows for a spatial event (that is, a point in spacetime) to be simultaneously assigned to multiple STBs that reflect multiple "densities" or resolutions, resulting in a set of generalized, or standardized, spacetime regions that is concurrently passed into the entity analytics product. The entity analytics product can then use a scoring algorithm to consider a range of spatial densities in evaluating proximity between two or more entities. However, the cost of transmitting and tracking multiple STBs per event can limit scalability. Thus, in accordance with various embodiments of the invention, proximity scoring algorithms can automatically consider multiple spatial densities, thus avoiding the overhead of transmitting and storing more than one STB per event.

In a first embodiment, the algorithm provides a range of spatial scoring possibilities, as if multiple STB features at different densities had been transmitted into the resolution engine and compared by the scoring algorithm through exact-match comparison of spatial quanta. In this embodiment, given just one pair of STB features for comparison, the scoring algorithm itself generates a set of representations of the region containing an event, and any or all adjacent regions, at successive spatial densities limited only by the densities of the given STB features. If the two representations match exactly, then the two events are spatially the same, and the score reflects a 100% perfect match. If no match is found, even when considering adjacent regions at all densities, then the events are considered to be spatially different and the score reflects a 0% match. If neither of these situations applies, then a matching score is computed based on spatial proximity, as determined by configurable settings fed into the algorithm.

In a second embodiment, the algorithm also takes time into account and scores events based on their proximity in time and space. The algorithm in accordance with this second embodiment relies on the spatial scoring method of the algorithm described above and then multiplies its score by a temporal comparison score to generate a total score. To do that, the second embodiment of the algorithm generates a range of quantized time intervals containing the event. This standardized set of time intervals can be applied to all events to generalize the timing of their occurrences, for comparison purposes. If the "most restrictive" of these standard time intervals contains two events, as an exact match, then the score reflects a 100% perfect temporal match. If the "least restrictive" of these standard time intervals does not overlap, then the score for those events reflects a 0% match. Otherwise, a score is computed based on temporal proximity and then multiplied by the spatial score to result in a total score.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented method such that the instructions which execute on the computer or other programmable apparatus provide processes for implementing the functions/acts specified in the flowcharts and/or block diagram block or blocks.

FIG. 1 shows a schematic of an example of an entity analytics system (100) used to resolve multiple entities to be one and the same entity or to recognize a relationship between entities, by comparing the entities' features and returning scores, in accordance with one embodiment. As can be seen in FIG. 1, the system (100) includes one or more computing nodes (10), which collaborate as will be described in further detail below to process data received in inbound messages from one or more data sources (102). Each node (10) can be an independent computer or processor that contributes to a larger task of performing the techniques described herein, for a given set of entities and events specified by the inbound messages from the data source(s) (102). One example of a data source is the Automatic Identification System (AIS), which is an automatic tracking system used aboard oceangoing vessels and by Vessel Traffic Services (VTS). AIS data is typically used for identifying and locating vessels by electronically exchanging data amongst vessels, AIS base stations, and satellites. AIS data also can be used by entity analytics systems. It should be realized, though, that this is merely one example and that people having ordinary skill in the art can easily come up with other alternatives of data sources that are suitable for use in motion processing in accordance with the techniques presented herein.

The nodes (10) are connected to a shared Relational Database Management System (RDBMS) (104), which can collect data from the nodes (10) and provide data to the nodes (10). The shared RDBMS (104) is only one example of a suitable basis for entity analytics processing and/or motion processing and is not intended to suggest any limitation as to the scope of use or functionality of embodiments of the invention described herein. The invention may be embodied, as otherwise described herein, without an RDBMS, for example by instead using an alternate form of storage or an entirely in-memory implementation. In an embodiment incorporating shared RDBMS (104), shared RDBMS (104) can contain, for example, data about data sources, observations, entities, features, and elements. A data source is typically a database table, a query, an extract from a system of record, or a sensor of events that occur in real time in a physical environment. An observation typically occurs when a record is added, changed, or deleted in a data source or when a physical event is observable via a sensor and may be represented by one or more records. An entity is typically associated with a particular type of record in a database table, such as a customer master record or a transaction record, and can reflect a physical object that may move through space over time and that may be represented by such a record. A feature is a particular piece of information about an entity. A feature may be represented by a group of fields that all describe aspects of the same thing. Many fields represent features all by themselves, but some can be grouped into a higher level. For instance, names and mailing addresses typically contain multiple fields or elements. An element is a further breakdown of a feature, such as the postal code that forms part of a typical address, and is typically represented by a field in a table.

By collecting this type of information in the shared RDBMS (104), the computing nodes (10) can work together to compare entities and features against each other and to resolve various types of entities and calculate relationship scores between entities, as will be described in further detail below. The relationship scores for the entities can be provided in an outbound message to one or more data destination(s) (106), which can be defined by a user. Examples of data destinations include the shared RDBMS (104), a motion processing program or system, an entity analytics product, a user-readable spreadsheet for display, etc.

It should be realized that motion processing and relationship scoring is merely one example of an area in which the techniques presented herein may be used, and that persons having ordinary skill in the art can easily come up with other alternatives of data destinations that are suitable for use. For example, other data destinations can include graphical modeling tools in which representations of physical entities can be coalesced based on proximity scores depending on the resolution of their display, machine learning systems in which proximity scores are associated with other input, e.g. for automated decision-making purposes, mapping utilities, automated navigation advisers for travelers (like the dashboard-mounted kind, or for hikers), systems for determining the motion of astronomical objects, and systems for the study of particle physics, just to mention a few examples. It should also be realized that while only one data source (102), one RDBMS (104) and one data destination (106) are illustrated in FIG. 1, in a real-life scenario, there may be multiple data sources (102), multiple (or zero) RDBMSs (104) and multiple data destinations (106) included in the entity analytics system (100).

Figure 2:
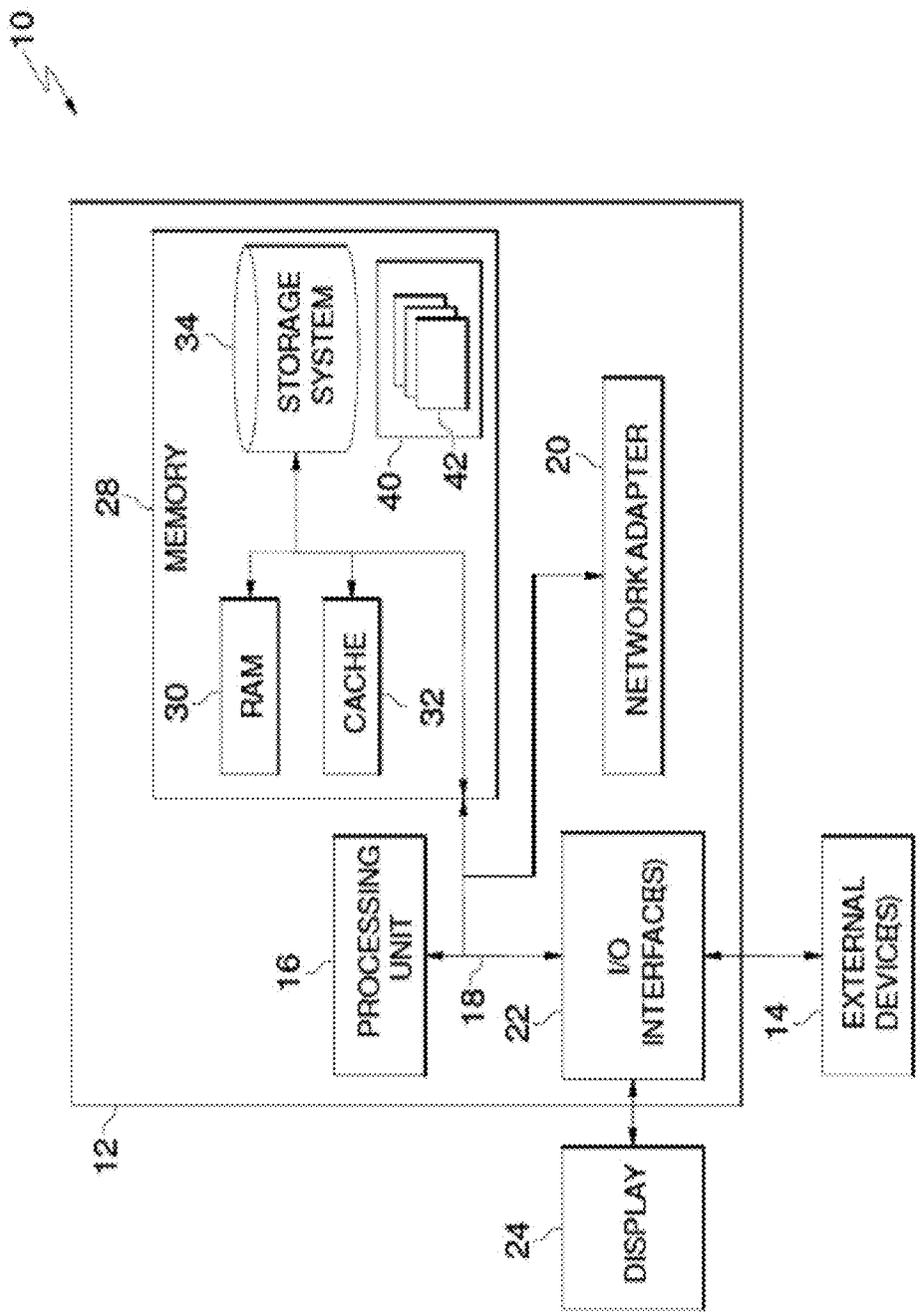
FIG. 2 shows a schematic example of a computing node, in accordance with one embodiment.

FIG. 2 shows a schematic example of a computing node (10). The computing node (10) is only one example of a suitable computing node and is not intended to suggest any limitation as to the scope of use or functionality of embodiments of the invention described herein. Regardless, the computing node (10) is capable of being implemented and/or performing any of the functionality set forth herein. In the computing node (10) there is a computing device (12). Examples of well-known computing devices include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed computing environments that include any of the above systems or devices, and the like.

The computing device (12) may be described in the general context of computer system executable instructions, such as program modules, being executed by a computer system. Generally, program modules may include routines, programs, objects, components, logic, data structures, and so on that perform particular tasks or implement particular abstract data types. The computing device (12) may be practiced in distributed cloud computing environments where tasks are performed by remote processing devices that are linked through a communications network. In a distributed cloud-computing environment, program modules may be located in both local and remote computer system storage media including memory storage devices.

As shown in FIG. 2, the computing device (12) in the computing node (10) is shown in the form of a general-purpose computing device. The components of the computing device (12) may include, but are not limited to, one or more processors or processing units (16), a system memory (28), and a bus (18) that couples various system components including system memory (28) to the processor (16).

The bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Peripheral Component Interconnect (PCI) bus, PCI Express bus, InfiniBand bus, HyperTransport bus, and Serial ATA (SATA) bus.

The computing device (12) typically includes a variety of computer system readable media. Such media may be any available media that is accessible by the computing device (12), and it includes both volatile and non-volatile media, and removable and non-removable media.

The system memory (28) can include computer system readable media in the form of volatile memory, such as random access memory (RAM) 30 and/or cache memory 32. The computing device (12) may further include other removable/non-removable, volatile/non-volatile computer system storage media. By way of example only, the storage system (34) can be provided for reading from and writing to a non-removable, non-volatile magnetic medium (not shown and typically called a "hard drive"). Although not shown, a magnetic disk drive for reading from and writing to a removable, non-volatile storage medium (e.g., a "USB flash drive"), and an optical disk drive for reading from or writing to a removable, non-volatile optical disk such as a CD-ROM, DVD-ROM or other optical media can be provided. In such instances, each can be connected to the bus (18) by one or more data media interfaces. As will be further depicted and described below, the memory (28) may include at least one program product having a set (e.g., at least one) of program modules that are configured to carry out the functions of embodiments of the invention.

The program/utility (40), having a set (at least one) of program modules (42), may be stored in the memory (28) by way of example, and not limitation, as well as an operating system, one or more application programs, other program modules, and program data. Each of the operating system, one or more application programs, other program modules, and program data or some combination thereof, may include an implementation of a networking environment. The program modules (42) generally carry out the functions and/or methodologies of embodiments of the invention as described herein. The computing device (12) may also communicate with one or more external devices (14) such as a keyboard, a pointing device, a display 24, etc.; one or more devices that enable a user to interact with the computing device (12); and/or any devices (e.g., network card, modem, etc.) that enable the computing device (12) to communicate with one or more other computing devices. Such communication can occur via Input/Output (I/O) interfaces (22). Still yet, the computing device (12) can communicate with one or more networks such as a local area network (LAN), a general wide area network (WAN), and/or a public network (e.g., the Internet) via the network adapter (20). As depicted, the network adapter (20) communicates with the other components of the computing device (12) via the bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

As was described above, entity data can be associated with multiple STBs, which each reflects a spatial region and time interval, at a specific density. In some embodiments suitable for reflecting entities on the Earth's surface, the STBs for an observed event are created by using a geohash public-domain geospatial-quantizing algorithm, along with a simple time-quantizing algorithm (see http://en.wikipedia.org/wiki/Geohash). The STBs are represented as alphanumeric strings, where the length of the string represents the "density" of the STB; that is, a longer string represents a denser STB (or, expressed differently, a more precise geospatial region and time interval). These alphanumeric strings will be referred to below as "STB keys." It should further be noted that in some embodiments, a bit vector can be used to represent a spatial region and/or a time interval. Storing spatial regions and time intervals represented as bit vectors can consume less space, and thus can better contribute to scalability, than storing alphanumeric strings. Further, alphanumeric strings or bit vectors can represent spatial regions that can be either geospatial or otherwise. It should be noted that space and time can be represented by means other than alphanumeric strings or bit vectors, and that the invention is not limited to embodiments that rely on the forms of space and time representation described herein.

Figure 3:
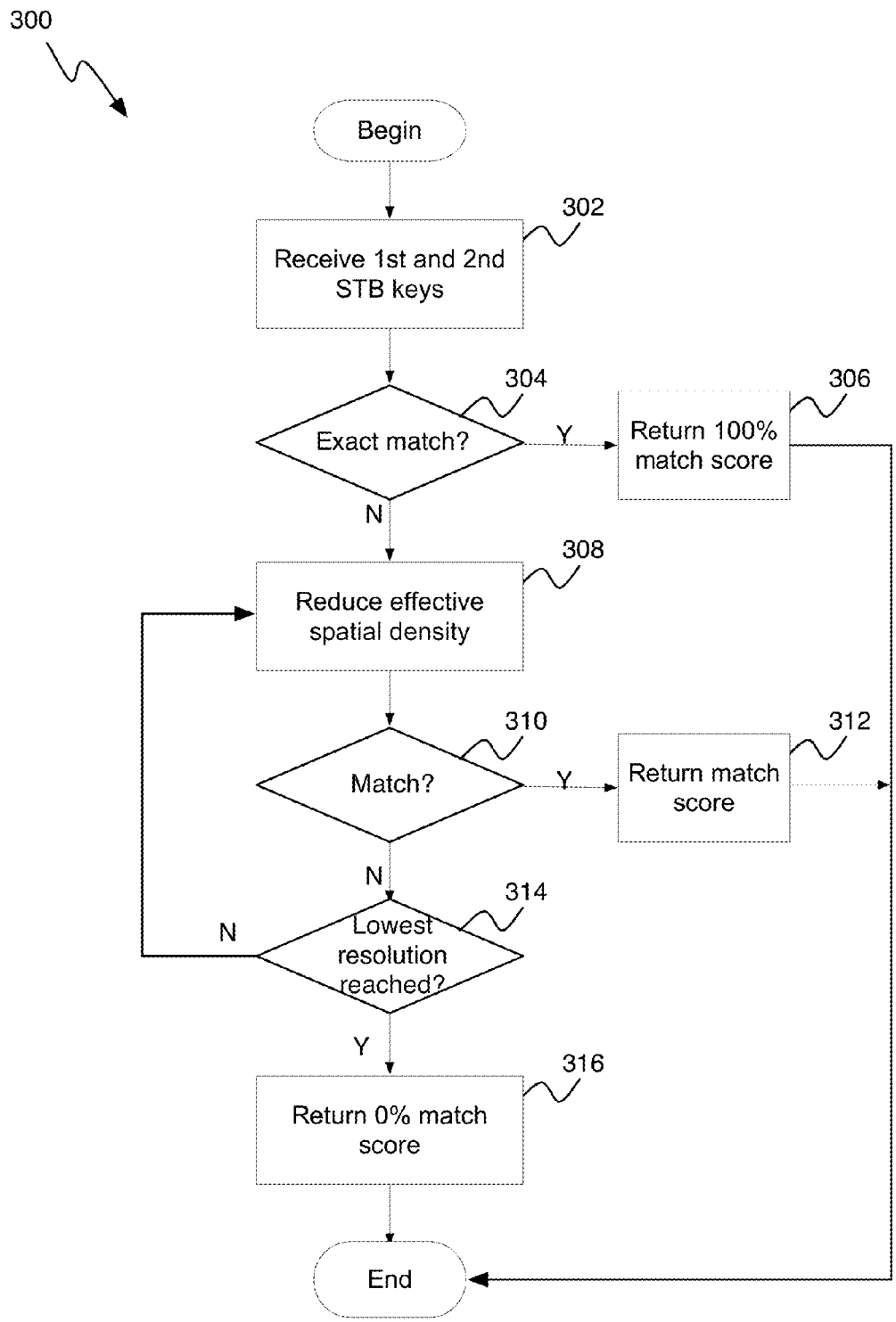
FIG. 3 shows a flowchart of a method for calculating a relationship score for two entities based on spatial proximity, in accordance with one embodiment.

FIG. 3 shows a flowchart of a method (300) in accordance with a first embodiment for calculating a relationship score for two entities based on spatial proximity. As can be seen in FIG. 3, the method (300) starts by receiving STB keys for two events for which a relationship score is to be calculated (step 302). Each observed event is associated with a single STB key reflecting a highest reasonable STB density, which may be defined based on the precision of the observation. In some embodiments, if no precision data is available, or at the user's choice, the STB density (i.e., the length of the STB keys) may be configurable. In some geospatially-oriented embodiments, the STB key can then include a geohash string containing a number of characters corresponding to that density (e.g. a six-character geohash string represents a region on the Earth's surface that is about nineteen meters across; an STB can include such a string). The STB key alternatively can include an alphanumeric string representing a generalized non-geospatial region, such as a portion of an image. The STB key alternatively can include bits of a spatial bit vector; the number of bits in the vector can correspond to spatial density.

Next, the STB keys for the first and second events are compared at their highest resolution level to determine whether they match exactly (step 304). If there is an exact match, then the events are in the same quantum of space, that is, the events are 100% comparable, and a 100% matching score is returned (step 306), which ends the method (300). In some geospatially-oriented embodiments, this occurs when geohash strings corresponding to two events are identical, as when the events are observed in the same geographical space.

Otherwise, if it is determined in step 304 that there is no exact match between the first and second STB keys, the effective spatial density of each STB key is reduced (step 308). In embodiments where STB keys are formed from alphanumeric strings, the strings can be truncated. The number of characters by which the string length is reduced, in those embodiments, can be a user-configurable number (e.g., 1). In embodiments where bit vectors are used, the number of bits used for comparison purposes can be reduced, e.g. by truncation, by dithering, by application of compression algorithms, or by other means appropriate for reflecting generalized spatial regions of successively lower density. The method then checks if the reduced-density STB keys match (step 310). If the STB keys match, then the events are in "close" scoring proximity, where "close" is defined as a configurable percentage, e.g. 90% comparable, and a score representing the matching level is returned (step 312), which ends the method.

If it is determined in step 310 that there is no match between the reduced-density first and second STB keys, the method checks whether a lowest comparable spatial density has been reached (step 314). If the lowest comparable spatial density has not been reached, the method returns to step 308 where the effective density of each STB key is further reduced, as described above. If it is determined in step 314 that the lowest comparable spatial density has been reached and there is still no match, then a non-matching score is returned (step 316) and the method (300) ends.

As the skilled reader realizes, the number of comparisons in the above method (300) can be reduced, for example for short geohash string lengths (e.g., 6 characters or less), or according to a configurable setting, thereby lending a smaller range of potential scoring results. The number of comparisons in the above method (300) also can be increased, thereby lending a larger range of potential scoring results.

In some embodiments, rather than returning a matching score, the scores can be converted to various textual descriptors that represent score levels. For example, a 100% matching score can be described as "same," a 90% matching score can be described as a "close," a 80% matching score can be described as a "likely," a 60% matching score can be described as a "plausible," a 20% matching score can be described as "unlikely," etc. One example of how to do this is shown in the following section of computer program code:

```
int32_t getRtnLevel(
        int32_t score
) const
{
    if (score >= mSameScore)
        return RTN_LEVEL_SAME_SCORE;
    if (score >= mCloseScore)
        return RTN_LEVEL_CLOSE_SCORE;
    if (score >= mLikelyScore)
        return RTN_LEVEL_LIKELY_SCORE;
```

```
        if (score >= mPlausibleScore)
            return RTN_LEVEL_PLAUSIBLE_SCORE;
        if (score >= mUnlikelyScore)
            return RTN_LEVEL_UNLIKELY_SCORE;
        return RTN_LEVEL_NONMATCHING_SCORE;
    }
```

In this context, it should also be noted that there are some STBs, for example, STBs representing geographical regions immediately on opposite sides of the equator, which can have completely dissimilar representations (e.g. entirely different geohash strings or bit vectors), though they are adjacent. To address such situations, the method (300) can, in some embodiments, optionally include a call out to a method that computes the alphanumeric strings or bit vectors for each of the immediately neighboring regions of the same density (e.g. the same number of geohash characters), before the method (300) proceeds with further STB key comparison, as described above. In one embodiment in which two input geohash strings are used to represent a pair of trapezoidal geospatial regions to be compared, a routine finds neighboring trapezoids by converting the geohash strings to bit vectors (still representing the same pair of trapezoidal regions), then performs some low-cost bit vector math to determine bit vectors corresponding to all of the neighboring trapezoids. The neighbors' bit vectors can be converted back to geohash strings, for comparison at a density that can be successively reduced by string truncation as described above. In another embodiment, the distance from the center of a trapezoid to the centers of its neighbors is computed, then a latitude and longitude for the center of each neighbor is determined, and finally geohash strings for those latitudes and longitudes are calculated for comparison at a density that can be successively reduced as described above.

It should be further noted that, as in the example described in the foregoing paragraph, in some embodiments an arbitrarily large number of STBs can be compared at a density that can be successively reduced as described above. Such a set of STBs can be input into a method that performs the steps of FIG. 3 for each pair of STBs in the set, rather than for merely a first and second STB. Where, as in the foregoing paragraph, an input set of STBs reflects a contiguous region for comparison with another input set of STBs that reflects another contiguous region, in some embodiments the output score can reflect the highest score obtainable by comparison, in accordance with the steps of FIG. 3, of the regions represented in the two input sets. In other embodiments, an output score can reflect an average, mean, or other aggregate score obtainable by comparison of two or more input sets of STBs.

It should also be noted that if a set of STBs of different densities is to be compared, then the method (300) or a caller of the method (300) can perform an initial step of spatial density matching. For example, if two geohash strings of different lengths are to be compared, then the longer string can be reduced in length via truncation, so that both strings effectively assume the shorter string's length, prior to execution of the STB comparison steps of the method (300). As another example, if two bit vectors representing spatial graticules of differing sizes are to be compared, then the bit vector representing the smaller graticule can be dithered to reflect the other bit vector's graticule size, prior to execution of the STB comparison steps of the method (300). Such an initial density matching step can be implemented in one or more of the method (300) itself or a method that invokes or leads to invocation of the method (300).

Figure 4:
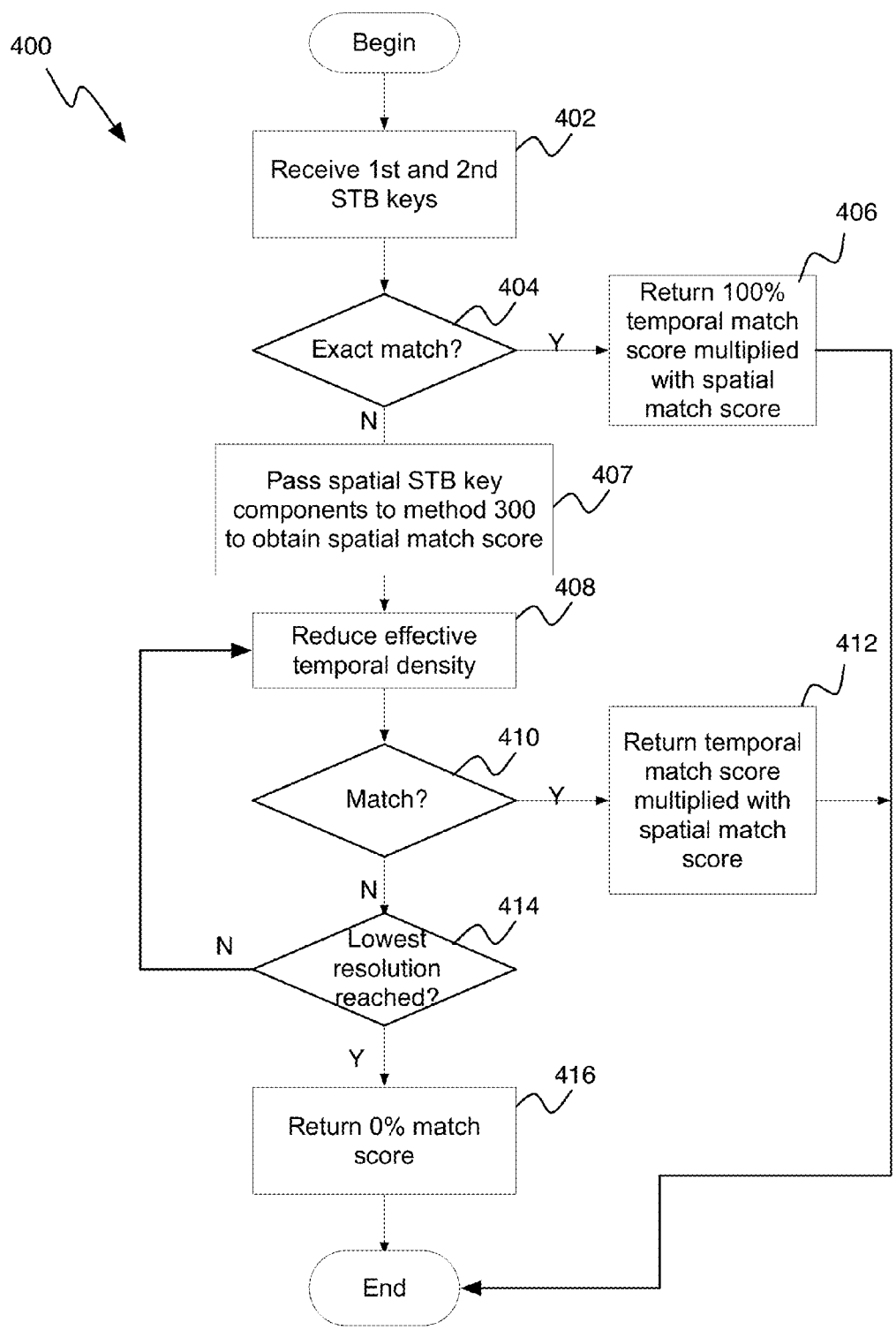
FIG. 4 shows a flowchart of a method for calculating a combined temporal and spatial relationship score for two events, in accordance with one embodiment.

FIG. 4 shows a flowchart of a method (400) in accordance with a first embodiment for calculating a combined temporal and spatial relationship score for two events, which reflects both a spatial and temporal match between the two events. As can be seen in FIG. 4, the method (400) starts by receiving a single STB key for each of a first and a second event (step 402). The STB keys reflect the highest reasonable spatial and temporal density, which can be defined based on the precision of any datetime value associated with the observation. In some embodiments, if no precision data is available, or at the user's choice, the temporal density (i.e., the lengths of temporal components of the STB keys) may be configurable. The STB keys can include a snapped-to-grid time interval corresponding to the temporal density (e.g. a datetime reflecting the beginning of a generalized interval, e.g., in five-second increments, and a datetime reflecting the end of that interval, e.g., five seconds later).

Next, the STB keys for the first and second events are compared at their highest resolution level to determine whether they match exactly (step 404). If there is an exact match, then the events are in precisely the same spatiotemporal region, that is, the events are 100% comparable, and a 100% matching score is returned (step 406), which ends the method (400).

Otherwise, if it is determined in step 404 that there is no exact match between the first and second STB keys, then the spatial components of the STBs are passed to method 300 to obtain a spatial match score for subsequent multiplication with the temporal match score (step 407) and the density of the temporal component of each STB key is reduced (step 408). That is, an extended datetime interval is selected out to some user-configurable number (e.g., the datetime interval may be increased from 5 seconds to 25 seconds, for example by extending the start of that interval to a time ten seconds earlier, and by extending the end of that interval to a time ten seconds later). Alternatively, an STB temporal component of lower density can be computed via a function that computes time intervals for STBs generally. The method then checks if the reduced-density temporal components of the STB keys match (step 410). If the reduced-density temporal components of the STB keys match, then the events are in "close" temporal scoring proximity, where "close" is defined as a configurable percentage, e.g. 90% comparable, and a score representing the temporal matching level multiplied by the spatial match score obtained via method 300 is returned (step 412), which ends the method (400).

If it is determined in step 410 that there is no temporal match between the reduced-density first and second STB keys, the method checks whether a lowest resolution has been reached (step 414). If the lowest resolution has not been reached, the method returns to step 408 where the density of the temporal component of each STB key is further reduced, as described above. If it is determined in step 414 that the lowest resolution has been reached and there is still no match, then a non-matching score is returned (step 416) and the method (400) ends.

As with the spatial proximity scoring method (300), the number of comparisons in the above method (400) can be reduced for low-temporal-density STB keys (e.g. those whose highest available event precision is in calendar days or months, in an application where every cognizable event occurs during a period of a few years), or according to a configurable setting, thereby lending a smaller range of potential scoring results.

Also here, rather than returning a total matching score, the total score can be converted to various textual descriptors that represent score levels. For example, a 100% matching score can be described as "same," a 90% matching score can be described as a "close," a 80% matching score can be described as a "likely," a 60% matching score can be described as a "plausible," a 20% matching score can be described as "unlikely," etc.

It should be noted that if a set of STBs of different temporal densities is to be compared, then the method (400) or a caller of the method (400) can perform an initial step of density matching. Temporal density matching for input STBs can be performed more or less similarly to spatial density matching as described above. As an example, suppose an STB reflecting a ten-second interval is to be compared with an STB reflecting a ten-millisecond interval. In one embodiment, the ten-millisecond interval can be extended equally forward and backward in time, prior to initial comparison with the ten-second interval. In another embodiment, the ten-millisecond interval can be extended to the boundaries of a ten-second STB, as determined by fitting the ten-millisecond interval into such an STB, prior to initial comparison with the ten-second interval. Either way, once the densities are effectively matched, the STBs can be further compared at successively reduced densities as described above.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer program product for determining a relationship score between a first physical entity and a second physical entity, the computer program product comprising a computer readable storage medium having program code embodied therewith, the program code executable by a processor to:
    generate, by the processor, a first computer-readable representation of a first spatial region containing the first physical entity;
    generate, by the processor, a second computer-readable representation of a second spatial region containing the second physical entity;
    compare, by the processor, the first computer-readable representation and the second computer-readable representation at decreasing resolutions until a matching condition is reached;
    assign, by the processor, a relationship score to one or more of the first physical entity and the second physical entity based on the resolution at which the matching condition is reached; and
    determine and take into account a temporal proximity between the first entity and the second entity when assigning the relationship score, wherein the program code for determining and taking into account the temporal proximity includes program code executable by a processor to:
        generate a first computer-readable representation of a first time interval associated with the first entity;
        generate a second computer-readable representation of a second time interval associated with the second entity;
        compare the first computer-readable representation and the second computer-readable representation at decreasing resolutions until a temporal matching condition is reached; and
        assign a temporal relationship score to one or more of the first entity and the second entity based on the resolution at which the temporal matching condition is reached.

2. The computer program product of claim 1, wherein the matching condition includes one or more of:
    an exact match of the first computer-readable representation and the second computer-readable representation,
    a partial match of the first computer-readable representation and the second computer-readable representation, and
    no match between the first computer-readable representation and the second computer-readable representation.

3. The computer program product of claim 1, further comprising program code executable by a processor to:
    multiply the temporal relationship score and the relationship score to obtain a combined temporal and spatial relationship score.

4. The computer program product of claim 1, wherein the first and second computer-readable representations are bit vectors and wherein decreasing the resolutions of the first and second computer-readable representations includes one or more of:
    truncating the bit vectors,
    dithering the bit vectors,
    applying compression algorithms to the bit vectors, generating additional bit vectors representing spatial regions adjacent to one or more of the first spatial region and the second spatial region, and truncating, dithering, or applying compression algorithms to one or more of the additional bit vectors.

5. The computer program product of claim 1, wherein the first and second computer-readable representations are geohash values and wherein decreasing the resolutions of the first and second computer-readable representations includes one or more of:

truncating the geohash values, generating additional geohash values representing spatial regions adjacent to one or more of the first spatial region and the second spatial region, and truncating one or more of the additional geohash values.

6. The computer program product of claim 1, wherein the first and second computer-readable representations reflect time intervals and wherein decreasing the resolutions of the first and second computer-readable representations includes one or more of:

extending the time intervals forward and backward in time, fitting the time intervals into larger quanta of a determinate size in a predefined temporal grid.

7. A system for determining a relationship score between a first physical entity and a second physical entity, comprising:

a processor; and a memory comprising instructions that when executed by the processor causes the following operations to be performed by the processor:

generating a first computer-readable representation of a first spatial region containing the first physical entity;

generating a second computer-readable representation of a second spatial region containing the second physical entity;

comparing the first computer-readable representation and the second computer-readable representation at decreasing resolutions until a matching condition is reached;

assigning a relationship score to one or more of the first physical entity and the second physical entity based on the resolution at which the matching condition is reached; and determining and taking into account a temporal proximity between the first entity and the second entity when assigning the relationship score, wherein determining and taking into account the temporal proximity includes:

generating a first computer-readable representation of a first time interval associated with the first entity;

generating a second computer-readable representation of a second time interval associated with the second entity;

comparing the first computer-readable representation and the second computer-readable representation at decreasing resolutions until a temporal matching condition is reached; and assigning a temporal relationship score to one or more of the first entity and the second entity based on the resolution at which the temporal matching condition is reached.

* * * * *